US006877003B2

(12) United States Patent
Ho et al.

(10) Patent No.: US 6,877,003 B2
(45) Date of Patent: Apr. 5, 2005

(54) EFFICIENT COLLATION ELEMENT STRUCTURE FOR HANDLING LARGE NUMBERS OF CHARACTERS

(75) Inventors: Ching-Lan Ho, San Mateo, CA (US); Jianping Yang, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 417 days.

(21) Appl. No.: 09/872,552

(22) Filed: May 31, 2001

(65) Prior Publication Data

US 2002/0184251 A1 Dec. 5, 2002

(51) Int. Cl.[7] .............................................. G06F 7/00
(52) U.S. Cl. ........................ 707/7; 707/4; 707/100; 704/8
(58) Field of Search ............................ 707/1–8, 100, 707/102, 200–201; 704/1, 8; 715/536

(56) References Cited

U.S. PATENT DOCUMENTS

| 5,440,482 | A | * | 8/1995 | Davis ............................. 707/6 |
| 5,485,373 | A | * | 1/1996 | Davis et al. ................. 715/536 |
| 5,615,366 | A | * | 3/1997 | Hansen .......................... 707/7 |
| 5,675,818 | A | * | 10/1997 | Kennedy ........................ 704/8 |
| 5,873,111 | A | * | 2/1999 | Edberg ........................ 715/536 |
| 6,381,616 | B1 | * | 4/2002 | Larson et al. ................ 707/201 |

OTHER PUBLICATIONS

Davis M: "ICU Collation Design Documentation", Internet Publication, May 31, 2000, XP002249274, Retrieved from the Internet: URL:http://oss.software,ibm.com/cvs/1cu/{checkout}/icuhtm1/design/collation/ICU_collation_design.htm?rev=1,11&content–type=text/plain retrieved on Jul. 25, 2003, section 2, paragraphs 1–2, section 5.1, subsection "special CEs", paragraph 1.

Ho C et al: "Multilingual Collation and CJK Sorts in Oracle 9i" Proceedings of 18th International Unicode Conference, Online Apr. 24–27, 2001, XP002249275, Hong Kong, Retrieved from the Internet: URL:http://www.unicode.org/iuc/iuc18/papers.html,retrieved on Jul. 25, 2003, cited in the application p. 21.

Davis, Mark et al: "Unicode Technical Standard #10, Unicode Collation Algorithm", Unicode Technical Report, Online, Mar. 23, 2001, XP002249276, Retrieved from the Internet: URL:http://www.unicode.org/reports/tr10/tr10–8.html, retrieved on Jul. 25, 2003, cited in the application, section 6.2, 6.3.2, 6.3.3, 6.11.1, and section 7.1, paragraph 1–3.

* cited by examiner

Primary Examiner—Greta Robinson
Assistant Examiner—Miranda Le
(74) Attorney, Agent, or Firm—Park, Vaughan & Fleming, LLP

(57) ABSTRACT

One embodiment of the present invention provides a system for facilitating use of a collation element that supports a large number of characters. The system operates by receiving the collation element and reading a primary weight value from a primary weight field within the collation element. If the primary weight value falls within a reserved set of values, the system reads an additional portion of the primary weight value from both a secondary weight field and a tertiary weight field within the collation element. On the other hand, if the primary weight value is not within the reserved set of values, the system reads a secondary weight value from the secondary weight field, and also reads a tertiary weight value from the tertiary weight field.

18 Claims, 4 Drawing Sheets

EFFICIENT COLLATION ELEMENT STRUCTURE FOR HANDLING LARGE NUMBERS OF CHARACTERS

BACKGROUND

1. Field of the Invention

The present invention relates to the process of indexing and sorting data within a database system. More specifically, the present invention relates to a method and an apparatus for providing an efficient collation element structure for encoding sorting weights for a large number of characters.

2. Related Art

One challenge in developing a database system is to support sorting for different languages. For example, some databases allow Japanese customers to specify the sorting method as "Japanese", while French customers specify the sorting method as "French". However, with the worldwide deployment of Internet technologies, it is becoming increasingly important for companies to provide multi-lingual capabilities in their software in order to expand their businesses globally.

As the data that is stored in databases becomes increasingly more multilingual, database users are increasingly more interested in using a single sort whose order is good for most languages.

Unfortunately, there can be thousands of different characters in a multilingual sort, and this causes the data structures involved in performing the multilingual sort to consume a lot of memory. Moreover, it can be hard to compact these data structures without degrading performance.

Multi-lingual sorting is typically accomplished by converting strings of characters into corresponding strings of collation elements (these strings are also known as sorting keys), and then comparing the strings of collation elements to perform the sorting operation. This conversion process is typically accomplished by looking up characters in a collation weight table that contains a corresponding collation weight for each character.

Unicode Technical Report No. 10 (from the Unicode Consortium) specifies a collation element structure that includes a 16-bit primary weight value followed by an eight-bit secondary weight value and an eight-bit tertiary weight value. The primary weight value identifies a character, while the secondary weight value specifies an accent on the character, and the tertiary weight value specifies case information (and possibly related punctuation) for the character. For example, the primary weight value may specify that a character is an "a", while the secondary value specifies that the character has an accent "ä", and the tertiary value specifies that the character is upper case "Ä".

Note that a comparison function typically compares the primary weights first. If the primary weights match, the comparison function compares the secondary weights. If both primary and secondary weights match, the comparison function compares the tertiary weights.

Note that the 16-bit primary weight value specified by Unicode Technical Report No. 10 can only encode 65,536 different characters. However, it is becoming necessary to provide more that 65,536 characters. This can be accomplished by increasing the size of the primary weight value to 32 bits (4 bytes). However, increasing the size of the primary weight value from 16 to 32 bits has a number of disadvantages: (1) more memory is required to build a linguistic index to support the 32-bit primary weight value; (2) access time to the linguistic index is increased; (3) more memory is required to store strings of collation elements; and (4) more computational operations are required to compare sorting keys.

What is needed is a method and an apparatus for using an efficient collation element structure that can handle a large number of characters without the above-mentioned problems.

SUMMARY

One embodiment of the present invention provides a system for facilitating use of a collation element that supports a large number of characters. The system operates by receiving the collation element and reading a primary weight value from a primary weight field within the collation element. If the primary weight value falls within a reserved set of values, the system reads an additional portion of the primary weight value from both a secondary weight field and a tertiary weight field within the collation element. On the other hand, if the primary weight value is not within the reserved set of values, the system reads a secondary weight value from the secondary weight field, and also reads a tertiary weight value from the tertiary weight field.

In one embodiment of the present invention, if the primary weight value falls within a reserved set of values, the system sets the secondary weight value to a secondary default value, and sets the tertiary weight value to a tertiary default value.

In one embodiment of the present invention, the collation element adheres to the Unicode standard.

In one embodiment of the present invention, the primary weight value identifies a character. Furthermore, the secondary weight value specifies an accent on the character, and the tertiary weight value can specify case information for the character.

In one embodiment of the present invention, the collation element is four bytes in size, of which the primary weight field is two bytes, the secondary weight field is one byte and the tertiary weight field is one byte, unless a value in the primary weight field belongs to the reserved set of values, in which case the primary weight field takes up all four bytes of the collation element.

In one embodiment of the present invention, the reserved set of values for the primary weight value includes hexidecimal values 0xFFF0-0xFFFF.

In one embodiment of the present invention, the collation element is taken from a collation weight table that is used to map characters to collation weights in order to establish an ordering between strings of characters.

In a variation on this embodiment, the system additionally constructs a sorting key for a string by reading each character in the string and looking up a corresponding collation element for each character from the collation weight table. The system subsequently adds the corresponding collation element for each character to the sorting key. Note that if this sorting key is associated with a record in a database, the sorting key can used to construct a linguistic index for the database

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
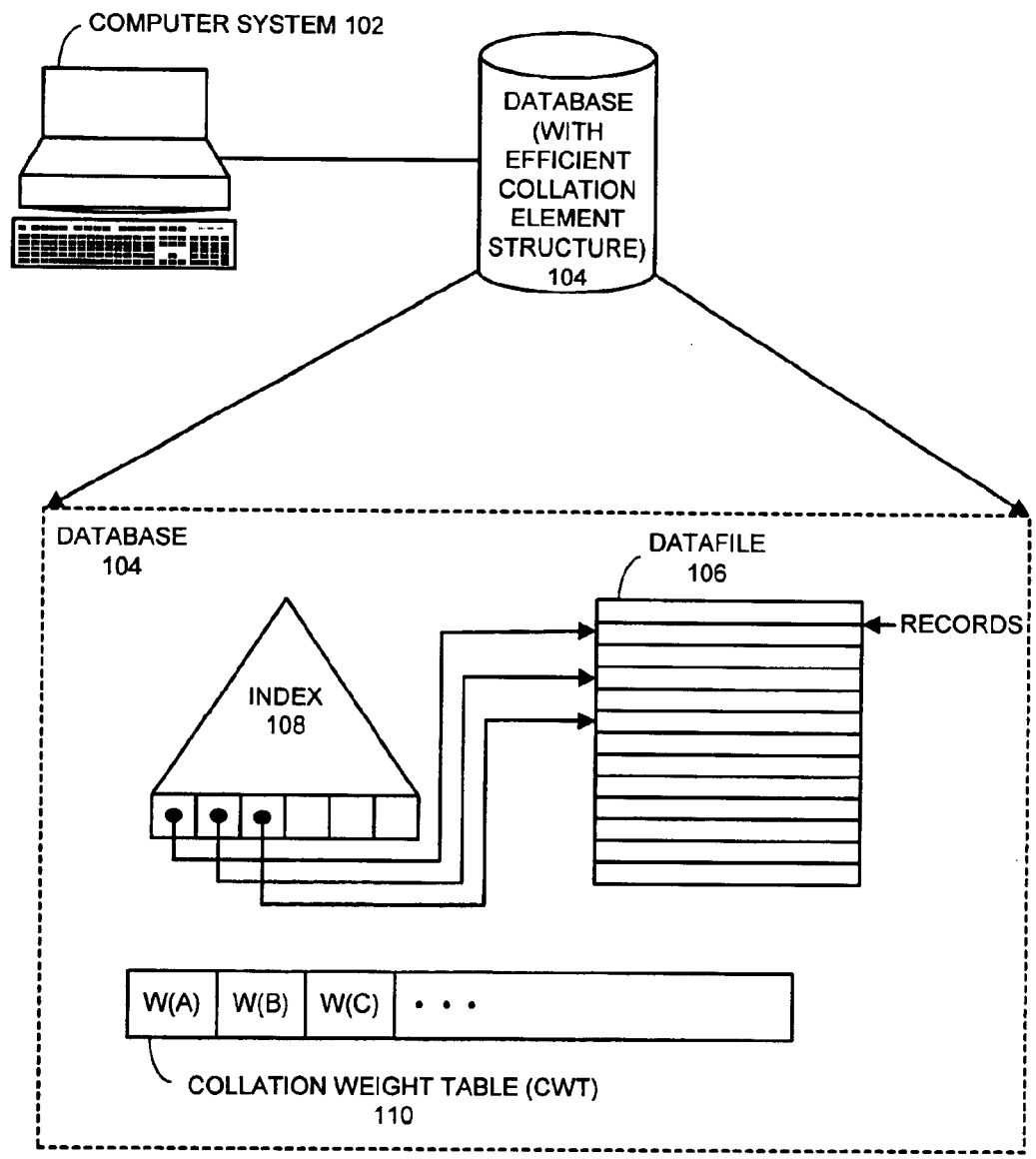
FIG. 1 illustrates a computer system with a database in accordance with an embodiment of the present invention.

FIG. 1 illustrates a computer system 102 with a database 104 in accordance with an embodiment of the present invention. Computer system 102 can generally include any type of computer system, including, but not limited to, a computer system based on a microprocessor, a mainframe computer, a digital signal processor, a portable computing device, a personal organizer, a device controller, and a computational engine within an appliance.

Database 104 can include any type of system for storing data in nonvolatile storage. This includes, but is not limited to, systems based upon magnetic, optical, and magneto-optical storage devices, as well as storage devices based on flash memory and/or battery-backed up memory. Database 104 includes a data file 106 comprised of a collection of collection of records, which are stored in insertion order. Data file 106 can be referenced through one or more indexes, such as index 108, which specifies an ordering for the records in data file 106. This ordering is typically determined by sorting an associated target column in data file 106. In order for this sorting to satisfy a specific linguistic sorting order, each character string in the target column is first converted into a sorting key by looking up characters in collation weight table 110. Note that collation weight table 110 is simply an array that contains a collation element for each possible character.

Structure of Collation Element

Figure 2:
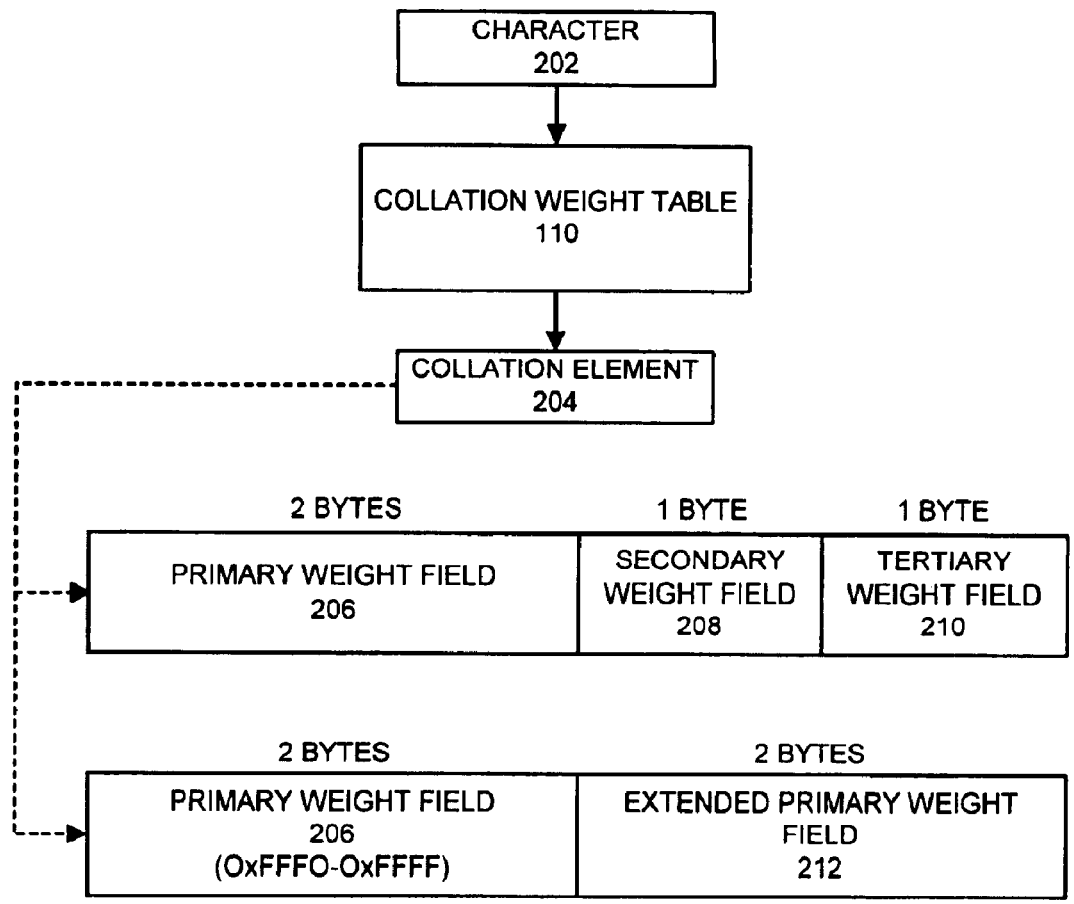
FIG. 2 illustrates alternative structures for a collation element in accordance with an embodiment of the present invention.

FIG. 2 illustrates alternative structures for a collation element 204 in accordance with an embodiment of the present invention. As illustrated in FIG. 2, collation element 204 is produced by performing a lookup into collation weight table 110.

In the illustrated embodiment, collation element 204 occupies four bytes of data, and can have one of two forms.

In a first form, the first two bytes of collation element 204 contain primary weight field 206, while the third byte contains secondary weight field 208 and the fourth byte contains tertiary weight field 210.

In a second form, the first two bytes of collation element 204 contain a reserved value in the range 0xFFF0–0xFFFF. This reserved value indicates that the third and fourth bytes of collation element 204 contain an extended portion of the primary weight field, instead of the secondary and tertiary weight values. In this case, the secondary and tertiary weight values are set to default values.

Note that the second form supports more than 1,000,000 different characters because each of the 16 possible values 0xFFF0–0XFFFF in the first and second bytes of collation element 204 is associated with 16 bits or 65,536 possible values in the third and fourth bytes of collation element 204.

Also note that the secondary and tertiary weight values can be set to default values because new characters with identifiers greater than 65,536 are Chinese Japanese and Korean (CJK) characters, mainly Han and Hangul Jamo characters, and there are no accent and case differences between Han/Hangul Jamo characters. Moreover, even in Far East Asia, people always order Latin-based letters and numerical characters before CJK characters.

Creating a Sorting Key

Figure 3A:
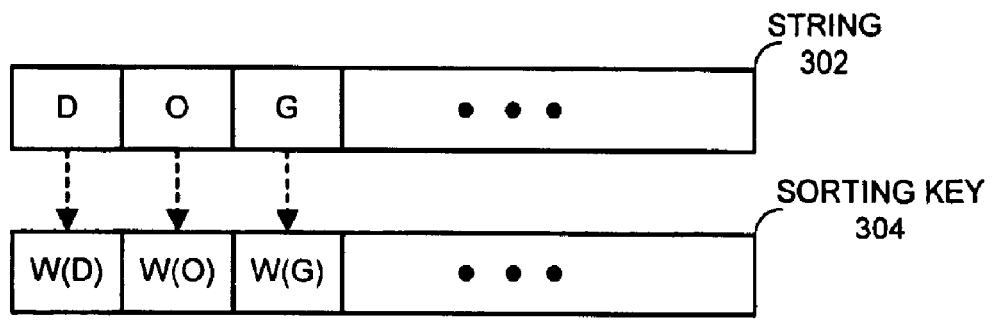
FIG. 3A illustrates how a sorting key is created in accordance with an embodiment of the present invention.

FIG. 3A illustrates how a sorting key is created in accordance with an embodiment of the present invention. In FIG. 3A, a string 302 is converted character-by-character into a string of collation elements (weights) that comprise sorting key 304 by looking up the individual characters in collation weight table 110.

Figure 3B:
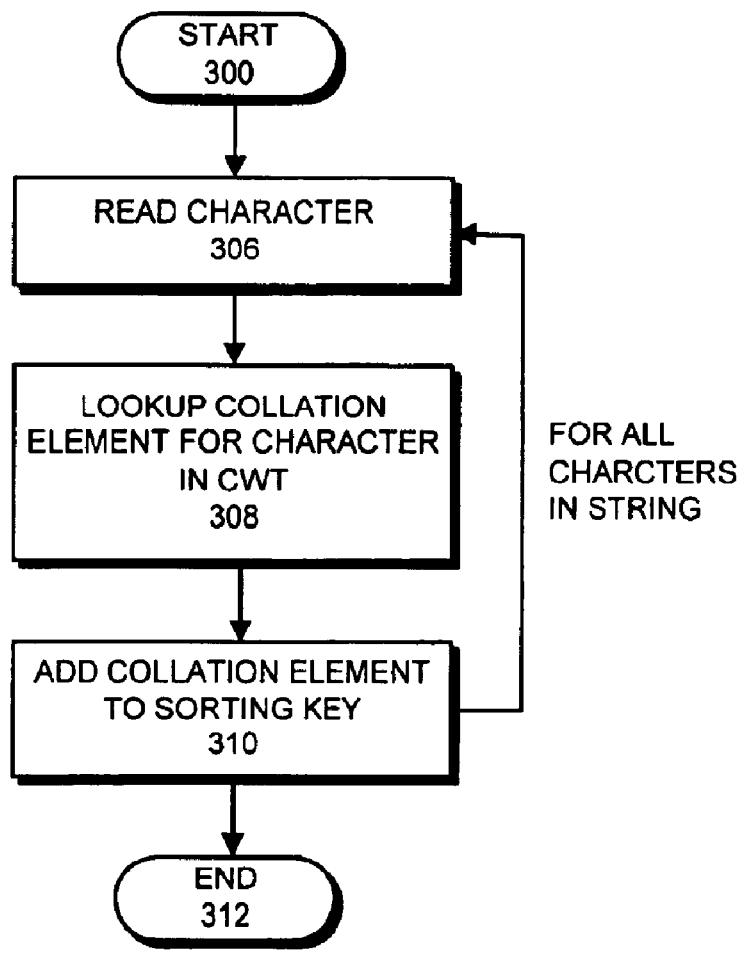
FIG. 3B is a flow chart illustrating the process of creating a sorting key in accordance with an embodiment of the present invention.

FIG. 3B is a flow chart illustrating the process of creating a sorting key 304 in accordance with an embodiment of the present invention. For each character 202 in a string 302, the system reads character 202 (step 306) and looks up a collation element 204 for character 202 in collation weight table 110 (step 308). The system then adds collation element 204 to sorting key 304 (step 310).

Reading a Collation Element

Figure 4:
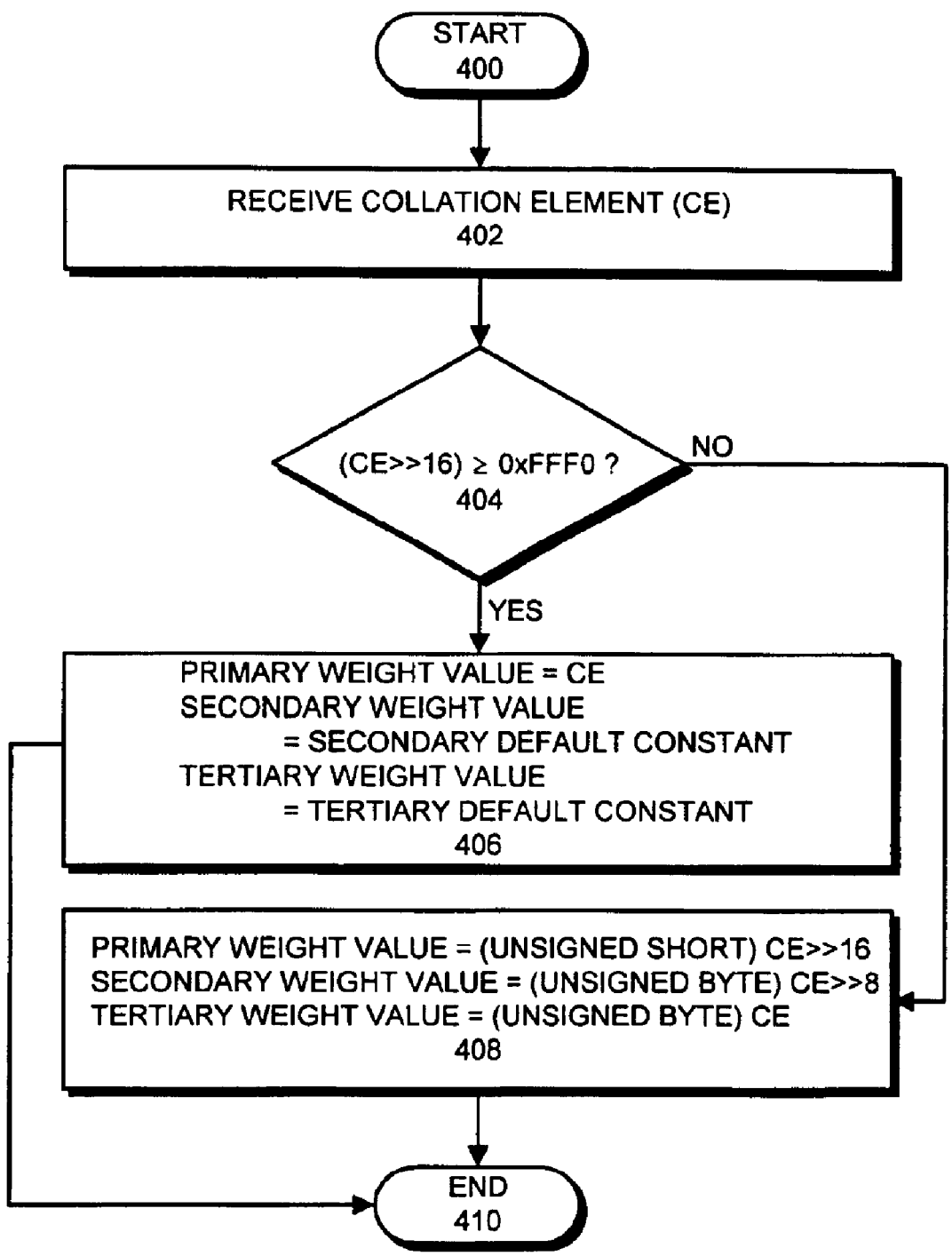
FIG. 4 is a flow chart illustrating the process of reading a collation element in accordance with an embodiment of the present invention.

FIG. 4 is a flow chart illustrating the process of reading a collation element 204 in accordance with an embodiment of the present invention. The system starts by receiving collation element 204 during a sorting process or some other operation requiring comparisons between sorting keys (step 402). Next, the system determines if the first two (higher order) bytes of collation element 204 contain a reserved value, which is greater than or equal to 0xFFF0 (step 404). If so, the system takes the primary weight value to be all four bytes of collation element 204, and the secondary and tertiary weight values are set to default values (step 406).

If the first two bytes of collation element 204 do not contain a reserved value, the system sets the primary weight value to be the first and second bytes of collation element 204. This is accomplished by shifting collation element 204 by 16 bits to the right, and then taking the remaining two bytes as the primary weight value. Next, the secondary weight value is taken from the third (second to lowest order) byte of collation element 204. This is accomplished by shifting collation element 204 right by eight bits and taking the secondary weight value to be the lower order byte of the remaining word. Finally, the tertiary weight value is taken from the fourth (lowest order) byte of collation element 204 (step 408).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating use of a collation element that supports a large number of characters, comprising:
   receiving the collation element;
   reading a primary weight value from a primary weight field within the collation element;
      if the primary weight value falls within a reserved set of values, extending the primary weight field to include all bits within the collation element, wherein each different primary weight value in the extended primary weight value field identifies a different character, whereby the size of the extended primary weight field increases the number of
   characters that can be represented by the collation element; and
      if the primary weight value is not within the reserved set of values,
         reading a secondary weight value from the secondary weight field within the collation element, and
         reading a tertiary weight value from the tertiary weight field within the collation element,
      wherein the collation element is four bytes in size, of which the primary weight field is two bytes, the secondary weight field is one byte and the tertiary weight field is one byte, unless a value in the primary weight field belongs to the reserved set of values, in which case the primary weight field takes up all four bytes of the collation element,
      wherein the reserved set of values for the primary weight value includes hexadecimal values XFFF0–OXFFFF,
      wherein the primary weight value identifies a character;
      wherein the secondary weight value can specify an accent on the character; and
      wherein the tertiary weight value can specify case information for the character.

2. The method of claim 1, wherein if the primary weight value falls within a reserved set of values, the method additionally comprises:
   setting the secondary weight value to a secondary default value; and
   setting the tertiary weight value to a tertiary default value.

3. The method of claim 1, wherein the collation element adheres to a structure specified in Unicode Technical Report No. 10.

4. The method of claim 1, wherein the collation element is taken from a collation weight table that is used to map characters to collation weights in order to establish an ordering between strings of characters.

5. The method of claim 4, further comprising constructing a sorting key for a string by:
   reading each character in the string;
   looking up a corresponding collation element for each character from the collation weight table; and
   adding the corresponding collation element for each character to the sorting key.

6. The method of claim 5,
   wherein the sorting key is associated with a record within a database; and
   wherein the sorting key is used to construct a linguistic index for the database.

7. A computer-readable storage medium storing instructions that when executed by a computer cause the computer to perform a method for facilitating use of a collation element that supports a large number of characters, the method comprising: receiving the collation element;
   reading a primary weight value from a primary weight field within the collation element;
      if the primary weight value falls within a reserved set of values, extending the primary weight field to include all bits within the collation element, wherein each different primary weight value in the extended primary weight value field identifies a different character, whereby the size of the extended primary weight field increases the number of characters that can be represented by the collation element; and
      if the primary weight value is not within the reserved set of values,
         reading a secondary weight value from the secondary weight field within the collation element, and
         reading a tertiary weight value from the tertiary weight field within the collation element,
      wherein the collation element is four bytes in size, of which the primary weight field is two bytes, the secondary weight field is one byte and the tertiary weight field is one byte, unless a value in the primary weight field belongs to the reserved set of values, in which case the primary weight field takes up all four bytes of the collation element,
      wherein the reserved set of values for the primary weight value includes hexadecimal values OXFFF0–OXFFFF,
      wherein the primary weight value identifies a character;
      wherein the secondary weight value can specify an accent on the character; and
      wherein the tertiary weight value can specify case information for the character.

8. The computer-readable storage medium of claim 7, wherein if the primary weight value falls within a reserved set of values, the method additionally comprises:
   setting the secondary weight value to a secondary default value; and
   setting the tertiary weight value to a tertiary default value.

9. The computer-readable storage medium of claim 7, wherein the collation element adheres to a structure specified in Unicode Technical Report No. 10.

10. The computer-readable storage medium of claim 7, wherein the collation element is taken from a collation weight table that is used to map characters to collation weights in order to establish an ordering between strings of characters.

11. The computer-readable storage medium of claim 10, wherein the method further comprises constructing a sorting key for a string by:
   reading each character in the string;
   looking up a corresponding collation element for each character from the collation weight table; and
   adding the corresponding collation element for each character to the sorting key.

12. The computer-readable storage medium of claim 11, wherein the sorting key, is associated with a record within a database; and
   wherein the sorting key is used to construct a linguistic index for the database.

13. An apparatus that facilitates use of a collation element that supports a large number of characters, comprising:
   an assignment mechanism that is configured to read a primary weight value from a primary weight field within the collation element;

wherein if the primary weight value falls within a reserved set of values, the assignment mechanism is configured to extend the primary weight field to include all bits within the collation element, wherein each different primary weight value in the extended primary weight value field identifies a different character, whereby the size of the extended primary weight field increases the number of characters that can be represented by the collation element; and wherein if the primary weight value is not within the reserved set of values, the assignment mechanism is configured to,
 read a secondary weight value from the secondary weight field within the collation element, and to
 read a tertiary weight value from the tertiary weight field within the collation element,
wherein the collation element is four bytes in size, of which the primary weight field is two bytes, the secondary weight field is one byte and the tertiary weight field is one byte, unless a value in the primary weight field belongs to the reserved set of values, in which case the primary weight field takes up all four bytes of the collation element,
wherein the reserved set of values for the primary weight value includes hexadecimal values OXFFF0–OXFFFF.
wherein the primary weight value identifies a character;
wherein the secondary weight value can specify an accent on the character; and
wherein the tertiary weight value can specify case information for the character.

14. The apparatus of claim 13, wherein if the primary weight value falls within the reserved set of values, the assignment mechanism is configured to:
 set the secondary weight value to a secondary default value; and to
 set the tertiary weight value to a tertiary default value.

15. The apparatus of claim 13, wherein the collation element adheres to a structure specified in Unicode Technical Report No. 10.

16. The apparatus of claim 13, wherein the collation element is taken from a collation weight table that is used to map characters to collation weights in order to establish an ordering between strings of characters.

17. The apparatus of claim 16, further comprising a key construction mechanism for constructing a sorting key for a string, wherein the key construction mechanism is configured to:
 read each character in the string;
 lookup a corresponding collation element for each character from the collation weight table; and to
 add the corresponding collation element for each character to the sorting key.

18. The apparatus of claim 17,
wherein the sorting key is associated with a record within a database; and
wherein the sorting key is used to construct a linguistic index for the database.

* * * * *

UNITED STATES PATENT AND TRADEMARK OFFICE
CERTIFICATE OF CORRECTION

PATENT NO. : 6,877,003 B2
DATED : April 5, 2005
INVENTOR(S) : Ching-Lan Ho

It is certified that error appears in the above-identified patent and that said Letters Patent is hereby corrected as shown below:

Column 5,
Line 36, please delete the string, "XFFFO-OXFFFF" and replace with the string
-- 0XFFF0-0XFFFF --.

Column 6,
Line 29, please delete the string, "OXFFFO-OXFFFF" and replace with the string
-- 0XFFF0-0XFFFF --.

Column 7,
Line 25, please delete the string, "OXFFFO-OXFFFF" and replace with the string
-- 0XFFF0-0XFFFF --.

Signed and Sealed this

Seventh Day of June, 2005

JON W. DUDAS
*Director of the United States Patent and Trademark Office*